US010936834B2

(12) United States Patent
Chang

(10) Patent No.: US 10,936,834 B2
(45) Date of Patent: Mar. 2, 2021

(54) CANVAS FOR TRACKING AND AUTHENTICATING ARTWORK AND TRACKABLE AUTHENTICATION SYSTEM THEREOF

(71) Applicant: Yung Yi Chang, Paris (FR)

(72) Inventor: Yung Yi Chang, Paris (FR)

( * ) Notice: Subject to any disclaimer, the term of this patent is extended or adjusted under 35 U.S.C. 154(b) by 0 days.

(21) Appl. No.: 16/427,357

(22) Filed: May 31, 2019

(65) Prior Publication Data

US 2020/0057876 A1    Feb. 20, 2020

Related U.S. Application Data

(60) Provisional application No. 62/679,758, filed on Jun. 1, 2018.

(51) Int. Cl.
| | | |
|---|---|---|
| *G06Q 30/00* | (2012.01) | |
| *G06K 7/10* | (2006.01) | |
| *H04L 9/08* | (2006.01) | |
| *G06K 19/07* | (2006.01) | |
| *G06Q 40/06* | (2012.01) | |
| *B44D 3/18* | (2006.01) | |

(52) U.S. Cl.
CPC ........... *G06K 7/10366* (2013.01); *B44D 3/18* (2013.01); *G06K 7/10297* (2013.01); *G06K 19/0723* (2013.01); *G06Q 40/06* (2013.01); *H04L 9/08* (2013.01); *H04L 2209/38* (2013.01)

(58) Field of Classification Search
CPC .. B44D 3/18; G06K 19/0723; G06K 7/10297; G06K 7/10366; G06Q 30/0185; G06Q 40/06; H04L 2209/38; H04L 2209/805; H04L 9/08; H04L 9/3239
See application file for complete search history.

(56) References Cited

U.S. PATENT DOCUMENTS

| | | | | |
|---|---|---|---|---|
| 2014/0125482 | A1* | 5/2014 | Rigsby | A61B 17/7001 340/539.13 |
| 2014/0240088 | A1* | 8/2014 | Robinette | G08B 13/1427 340/5.61 |
| 2014/0242908 | A1* | 8/2014 | Rosenberg | H04B 5/0056 455/41.1 |
| 2016/0327979 | A1* | 11/2016 | Lettow | B60N 2/56 |
| 2016/0332097 | A1* | 11/2016 | Tetterton | B08B 17/04 |
| 2017/0238665 | A1* | 8/2017 | Phipps | A45C 11/10 |
| 2018/0121773 | A1* | 5/2018 | Tercsinecz | G06K 19/0702 |

* cited by examiner

*Primary Examiner* — Thien M Le
(74) *Attorney, Agent, or Firm* — Hannah Tien

(57) ABSTRACT

The present invention is related to a trackable authentication system of canvas for tracking and authenticating artwork, the canvas comprising: a canvas made by thread; and a plurality of wireless communication chips, that is NFC (Near Field Communication) or RFID (Radio Frequency Identification) chip, each chip being disposed at an appropriate position wherein a plurality of threads are knitted into canvas material for the canvas, and wherein the NFC or RFID chips are for transferring verifiable codes and the codes are provided with tracking and authentification information.

13 Claims, 4 Drawing Sheets

CANVAS FOR TRACKING AND AUTHENTICATING ARTWORK AND TRACKABLE AUTHENTICATION SYSTEM THEREOF

CROSS-REFERENCES TO RELATED APPLICATIONS

The present application claims priority to U.S. Provisional Appl. No. 62/679,758 filed on Jun. 1, 2018, incorporated herein by reference in its entirety.

BACKGROUND OF THE INVENTION

In the industry chain of the art and collectibles market, it is an intractable problem to verify the authenticity of the purchased goods and whether the seller has the right to sell. The collection history of works mostly has always been identified by experts, but even the first-class international art auction company cannot guarantee that the product in every transaction in the auction is genuine. In particular, when property rights are transferred, the real property owner of the object should be confirmed first. It is also necessary to transfer the relevant supporting documents and files to the next owner of the property rights. At the same time, when the artwork is insured, if it is impossible to confirm who is the legal owner, it may cause a lot of troubles, and such cases have repeatedly occurred in the art market.

The property rights record and property ownership are important because of two aspects: First, having the ownership of the item can prove the property right of the property owner, and through having the ownership someone can have the right to resell, insure, mortgage, etc.; Second, the ownership transfer history will directly affect the actual value of the item. The history of the ownership transfer of the item also refers to the source of the item, which is almost a direct manifestation of the economic value of the item, because the source is the most important indicator to prove the authenticity of the item.

Ideally, the source traceability records should be recorded by a credible agency institutions when art or collections have been produced, then there will be a continuous, uninterrupted ownership of the items inheritance history. Unfortunately, the traceability document and even the record of transferring ownership can be forged. Therefore, fakes, counterfeits product and false ownership are the biggest risks faced by collectors, which cause the origin and ownership of the item be the problem that most needed to be solved in current art and collectibles market. On the other hand, the artist often unable to track their works and could not fully grasp the credit of resale royalties, resale rights, etc., which tends to cause undesired operation on the market.

Furthermore, use artworks as a mortgage for lending and investment, the share and distribution of income cannot be effectively and equitably managed. Therefore, through a combination of the blockchain technology, it allows the lender to get an endorsement for confirming the valuation, authenticity, and ownership of the artworks. It can be more effective in developing the securitization, diversification index and futures of art assets.

The application of block chain in the art market always has a problem, it is unable to prevent the owner for changing the genuine product into fake product, and utilize the source traceability technology to resale the fake product as genuine, current solution is using network self-registration or to issue a virtual currency (token) to achieve transaction guarantee. However, the virtual currency unit has not been stable and fluctuating too much, and the link with the entity transaction is weak, whether it can effectively achieve the identification function is a big doubt.

In general, oil canvas is an indivisible component of the artwork, it also reflects the spirit and aesthetic value or the work. The high-quality canvas has special textile texture which as a technique in achieving the purpose of creation. The absorption, elasticity, brush feel and adhesion of high-quality canvas are important conditions for completing the creative work; due to its durability, stability, and toughness, high-quality canvas is full of vitality, and it plays a supporting and protective function for the work. In general, the traditional oil painting canvas material is very diverse, the canvas can be divided into the synthetic fiber, cotton, blended, imitation linen, pure hemp and so on. A German professor of Bavaria Royal Academy of Fine Arts, Munich, Max Duo Naier (1870-1939), stated in his book "The Materials of the Artist and Their Use in Painting," (this book has long been regarded by Western Art as one of the most important work for techniques in materials science, it is known as "artist's Bible"), that the canvas most commonly used by painters is ordinary linen. The method of interlacing warp and weft tightly entangles the lines which make the densest, uniform canvas; inferior textiles will have knots and pores. Oil painting linen canvas generally adopts woven plain weave, that is, the warp and weft (longitudinal and transverse) thread cross each other, and the plain weave strictly controls the upper and lower of the warp and weft to 1:1. The western oil painting has been verified practically for nearly five hundred years, tightly thick, uniform, knotless and porous linen is most suitable as a canvas. Linen differentia into single weave (SW) and double weave (DW), which is easy to handle various specifications of different thicknesses, and different textures. The coarse-grained linen is suitable for painting with large pens and scrapers. It is an ideal canvas to present bold yet fluent style. Medium density linen is smooth, it has a uniform texture, which is most suitable for realism drawing style. Fine-textured linens are used in small pieces, fine painting styles. In terms of preservation and restoration, linen oil painting is superior to other types of oil painting.

Currently, in several kinds of canvases that made of linen textile, the most high grade is the dew retting, blue-gray in color, bright and shiny, it currently has the best performance levels as canvas painting substrate; Secondly, linen, bright yellow in color, has a good gloss; Linen cotton canvas is the most commonly used canvas, suitable for practice and short-term hall decoration canvas, pale yellow, canvas-covered with dense yellow/brown/black dots hemp grain knot, dull, performance level is not like half of the linen canvas; However, the traditional canvas, regardless of its material, are not able to have both digital traits and the use, preservation, and tracking of artwork.

While the electronic fibers use a flexible, extensible conductive thread, to weave the electric conduct circuit (e.g. PAN, LAN, WAN signaling, etc.), the signal may be transmitted to an external processing device, such as a portable device or computer, the conductive thread that currently produced by the manufacturer Noble Biomaterials can be used for signal transmission and data circuits, and provide EMI/RF shielded cable performance. In addition, E-threads from the French manufacturer Primo1D is a radio frequency identification (RFID) thread that can be directly embedded in the RFID component, and it is not additionally sewed or attached to the fabric. Although it is integral and indivisible, it still encounters problems such as the artworks cannot track and authenticate, trace and preserve which is not conducive to the investment of art assets.

SUMMARY OF THE INVENTION

Based on the basic material for artworks, oil painting canvas, comprising unprimed canvas and the primed canvas of innovative textile technology, the present invention proposes a thread combining both physical and virtual as a whole, in other words using the thread that had embedded electronic component, which is also known as smart textiles or smart fabrics/e-thread, including fabrics, yarns and threads, by utilizing electronic thread to integrate the characteristics of the sensor and the driver; the present invention also proposes a conductive thread comprising metal fibers, metal thread, conductive nylon long fibers, and more conductive thread, which is mixed spinning with linen or cotton, existing oil painting canvas textile material. Using the conductivity characteristics of smart fiber and theory of technology application, combining application programming interface (API) to import blockchain technology and smart contracts (the hash value of the document file related), produce an electronic sensor canvas to solve the problems of tracking and authenticating artworks and art asset's investment, trace, preservation, etc. in art asset field.

The invention also aims to provide a canvas for tracking and authentication artwork and trackable authentication system thereof, which can be used for:

works collection editing management system (smart contract);
works catalog database management (smart contract);
copy and re-sale of works (smart contract/virtual currency) GPS theft tracking (smart conductive fiber);
disaster prevention alarm sensing notification (warm sensing of smart fiber);
Crowdfunding artworks/rental flow management (blockchain virtual currency technology);
AR or VR technology development (smart fiber conduction); and
future application in gallery sketch, virtual exhibitions, and teaching reminder.

The present invention can propose the effective implementation and application for the entire industry, not only can solve the problem of ownership, purchase, and artworks tracking and authenticating, but also improve efficiency in storage, logistics, inventory management, insurance and so on. It can achieve decentralization management in the art market.

Another purpose of the present invention is to design the canvas for tracking and authenticating artworks into evidence that contain artworks ownership and can be used as a platform for property rights registration of painting art (including but not limited to such as oil painting). Specifically, the present invention system for tracing and authentifying a canvas for tracking and authentifying artwork may comprise the following related records:

all artworks ownership and transfer history record from the start of the ownership of the canvas for tracking and authenticating artwork; hash values of the relevant documents (such as the artist's fingerprints, photos, past evaluation records, receipts, repair records, etc.) can be stored elsewhere and store the hash value of the cited address in the smart contract.

The trackable authentication system of canvas for tracking and authenticating artwork of the present invention, can track the ownership and transfer history record through blockchain. The ownership of the canvas for tracking and authenticating artwork provide everyone a method to verify ownership. This the method is a process of decentralization, and it is also anonymous and is without mutual trust, so that the property owner of the artwork does not need to indicate his/her identity, nor does it need any centralized authority to know his/her identity.

The system for tracing and authentifying a canvas for tracking and authentifying artwork of the present invention will allow new buyers to view the ownership record of the artworks. Although the buyer cannot see the undisclosed information of the former property owner, the buyer can see the history and time of the ownership transfer and the information of the former property rights that is public, and these former property rights persons may be personal entities or an intermediary, such as an artist or an auction house. This will enable buyers to believe that they are buying genuine and normal goods as these records endorsed it actual value. Buyers will generate a sense of trust due to these records and are willing to pay the fee to purchase paintings directly from the artist.

Another aim of the present invention is to provide a system for tracing and authentifying a canvas for tracking and authentifying artwork that can be used as effective implementation and application for the entire industry, not only can solve the problem of ownership, purchase and source traceability, but also improve the efficiency of the logistics, inventory management, insurance, and other aspects.

In addition, the system for tracing and authentifying a canvas for tracking and authentifying artwork of the present invention can provide other services in the art industry ecosystem such as asset mortgage, partial ownership, and the key factor for expansion and development of insurance product in art and collectibles For auction houses, galleries and dealers, the system for tracing and authentifying a canvas for tracking and authentifying artwork of the present invention provides an efficient inventory and shipment tracking function, so that part of the trading process, source traceability, can be more simple and provable. If there is any resale experience, the canvas for tracking and authenticating artwork can also help the agency to trace the specific artwork for the customers.

In other words, the system for tracing and authentifying a canvas for tracking and authentifying artwork of the present invention can help suppliers to protect themselves from counterfeit trading, money laundering and terrorist financing intrusion. Finally, the canvas for tracking and authenticating artwork can also be used in smart contracts hosted by proprietary information vendors to facilitate transactions at the same time reducing the presence of unqualified bidders.

Moreover, for collectors and investors, the system for tracing and authentifying a canvas for tracking and authentifying artwork of the present invention provides collectors and investors a higher confidence in the integrity of the purchased goods, which will speed up the transaction process while simplifying the transaction and reduce the cost of holding art and collectibles (such as insurance) over time. The system for tracing and authentifying a canvas for tracking and authentifying artwork of the present invention will establish an underlying infrastructure for application's developers of inventory and wealth management. Using high-efficiency ownership registration system can also provide investors other investment models such as partial ownership. Once these things are simplified, there are huge opportunities in derivatives financial products, including securitization of commercial assets, diversification index, and futures. Lastly, system for tracing and authentifying a canvas for tracking and authentifying artwork of the present invention can also help collectors to find their desired products more quickly and conveniently.

As for the artist, in terms of his or her heritage and fund, the application constructed based on the system for tracing and authentifying a canvas for tracking and authentifying artwork of the present invention can provide effective cataloging and archive for artists, thereby preventing the production and proliferation of fake and counterfeit goods, and to a certain extent, prevent the artworks market of an artist from being mishandled. The artist and his/her heritage can establish the appropriate directory index by using the system for tracing and authentifying a canvas for tracking and authentifying artwork of the present invention. Tracking resale royalty payments will be simplified by using the system for tracing and authentifying a canvas for tracking and authentifying artwork of the present invention.

For asset-backed lender, there is a huge market in art collections lending field. There are many reasons why the owner seeks for a loan. For example, if they are rich in assets but have insufficient cash flow and need to meet their financial obligations, loans secured by art and collectible property may be their only viable option. The canvas for tracking and authenticating artwork supports art mortgage loan because it allows the lender to get a better endorsement for the artworks' valuation, authenticity, and ownership. This means that lenders will be more and more willing to accept larger scale art asset mortgage loan. A related application of the system for tracing and authentifying a canvas for tracking and authentifying artwork of the present invention will launch to support the real-time quotation function for mortgage loans of existing artworks and collections. The system for tracing and authentifying a canvas for tracking and authentifying artwork of the present invention can also add lien information in ownership information in order to make the lender more at ease.

For insurance companies, there is a huge market for art and collectibles in the field of insurance since art is at risk of being damaged both at home and in transit. The application of the system for tracing and authentifying a canvas for tracking and authentifying artwork of the present invention allows the owner quickly and easily obtain the quotation of insured artworks and directly insured, which the price will be updated simultaneously based on changes in the value of their holdings. By using the system for tracing and authentifying a canvas for tracking and authentifying artwork of the present invention, ones are able to track situation during transport, verification of insurance quotation and manage the claim process to reduce the cost of insurance investigation, management and underwriting.

For storage and logistics industry, artworks storage logistics is a multi-billion dollar industry, but it still relies on paper records and outdated systems. A corresponding application (RFID) can be created on the basis of the system for tracing and authentifying a canvas for tracking and authentifying artwork of the present invention to manage the storage and logistics of the artworks.

For museums, art and collectibles are often bequeathed to museums for immediate tax reduction. This can be complicated and costly, but it can be made simple by using the model contract and the system for tracing and authentifying a canvas for tracking and authentifying artwork of the present invention.

A canvas for tracking and authenticating artwork according to the present invention, comprising: a canvas manufactured from thread; and a plurality of radio communication chips, e.g. Near Field Communication (NFC) or a Radio Frequency Identification (RFID) chips, each chip being disposed at an appropriate position, wherein a plurality of thread are kitted into the canvas material for the canvas, and wherein each of the NFC or RFID chips are for transferring verifiable codes and the codes are provided with tracking and authentication information.

Moreover, a system for tracing and authentifying a canvas for tracking and authentifying artwork of the present invention, comprising: a canvas for tracking and authentifying artwork, including a canvas knitted from a plurality of threads, and a plurality of Near Field Communication (NFC) chips or Radio Frequency Identification (RFID) chips, each NFC or RFID chip being disposed at an appropriate position of the plurality of the threads, wherein the plurality of NFC or RFID chips are for transferring verifiable coded information; a device capable of reading RFID for receiving and reading the verifiable coded information from the NFC or RFID chips; a server, being connected to the device capable of reading RFID, for processing and storing the verifiable coded information from the NFC or RFID chips after processing; and a blockchain processor, being connected to the server, for receiving the verifiable coded information from the NFC or RFID chips after processing and integrating the processed coded information within a blockchain so as to trace and authentify the canvas.

EXAMPLES

The canvas for tracking and authenticating artwork of the present invention is mix textiled with two to three types of electronic threads and linen or cotton through traditional oil painting canvas textile technology. Combine the electronic threads that can use as signal transduction and data circuit and Radio Frequency Identification (RFID) threads by using the conductive loop textile technology, to produce the canvas for tracking and authenticating artwork.

According to the system for tracing and authentifying a canvas for tracking and authentifying artwork of the present invention, APP can be used to integrate the canvas for tracking and authenticating artwork with blockchain technology by application programming interface Attached diagram for reference to describe the embodiments in detail.

Figure 1A:
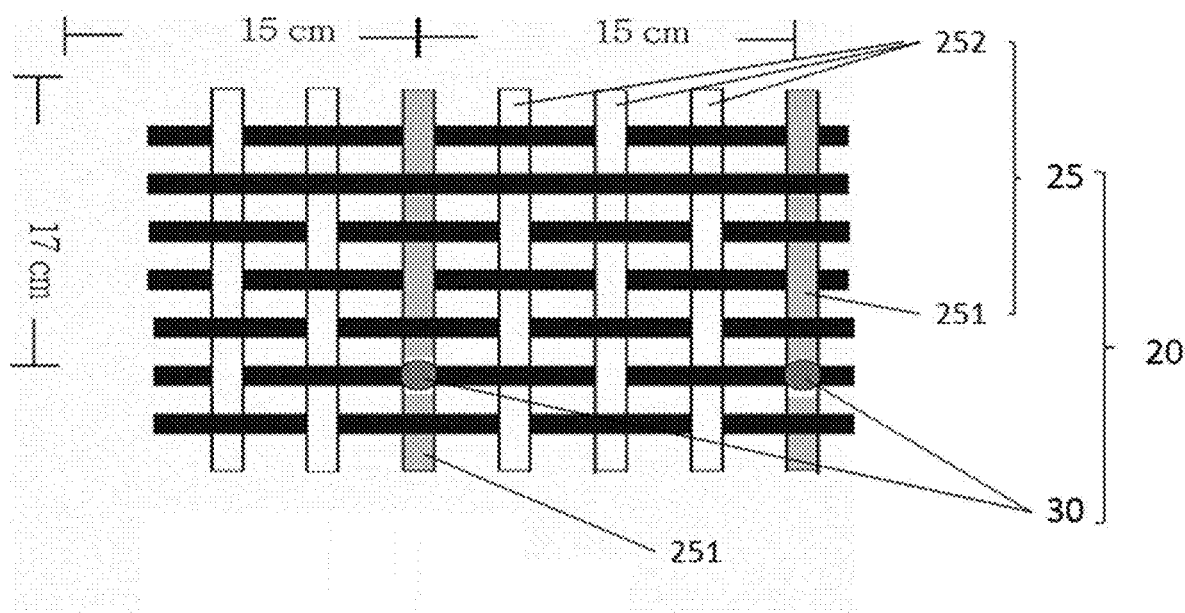
FIG. 1a and FIG. 1b respectively show a schematic diagram of the NFC or RFID chip disposed on the thread and schematic diagram of the distribution of textile canvas fabric of the canvas for tracking and authenticating artwork of the present invention.
Figure 1B:
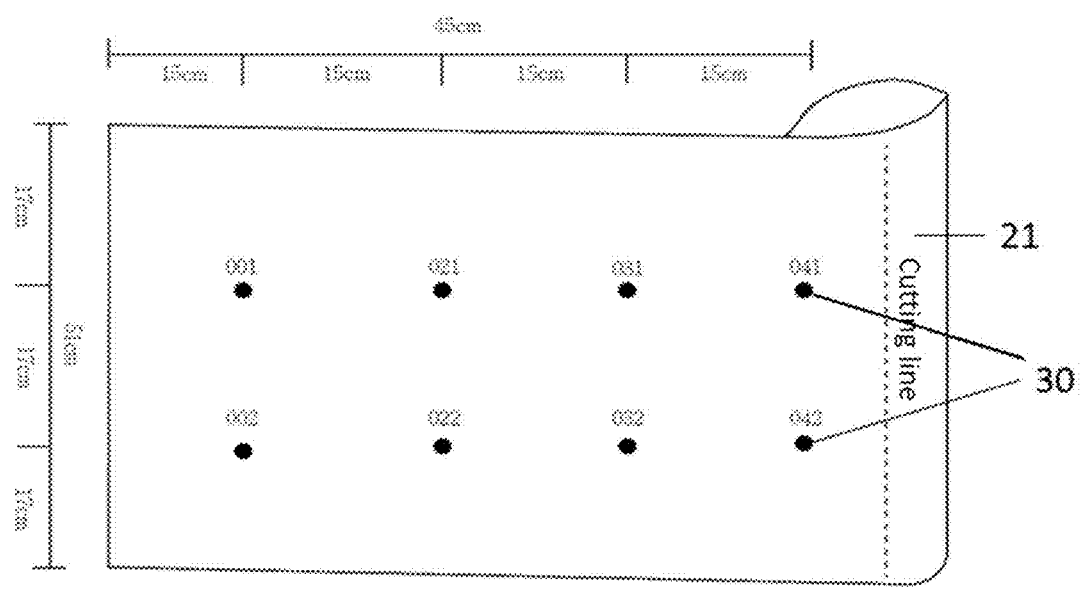

As shown in FIGS. 1a and 1b, in accordance with the present invention, a canvas 20 for tracking and authenticating artwork, comprising: a canvas 20 manufactured by a plurality of threads 25, includes electronic threads 251 and normal threads 252, and a plurality of radio communication chips 30, e.g. NFC (Near Field Communication) or RFID (Radio Frequency Identification) chips, each chip being disposed at an appropriate position of electronic thread 251. The normal thread 252 is not disposed of NFC or RFID chip, wherein a plurality of threads 251, 252 are knitted into canvas material for the canvas, and wherein the NFC or RFID chips 30 are for transferring verifiable codes and the codes are provided with tracking and authentication information.

The canvas 20 for tracking and authentifying artwork of the present invention, the thread is synthetic fiber, cotton, blended fiber, imitation linen or pure linen. Also, the canvas can be used for oil painting or mixed media creation.

Additionally, the canvas 20 for tracking and authentifying artwork of the present invention, the plurality of NFC or RFID chips 30 are embeded into and installed at predetermined positions in a whole or a partial part of the threads of the canvas, and wherein the canvas is knitted continuously from the NFC or RFID thread 251 reels.

Figure 2:
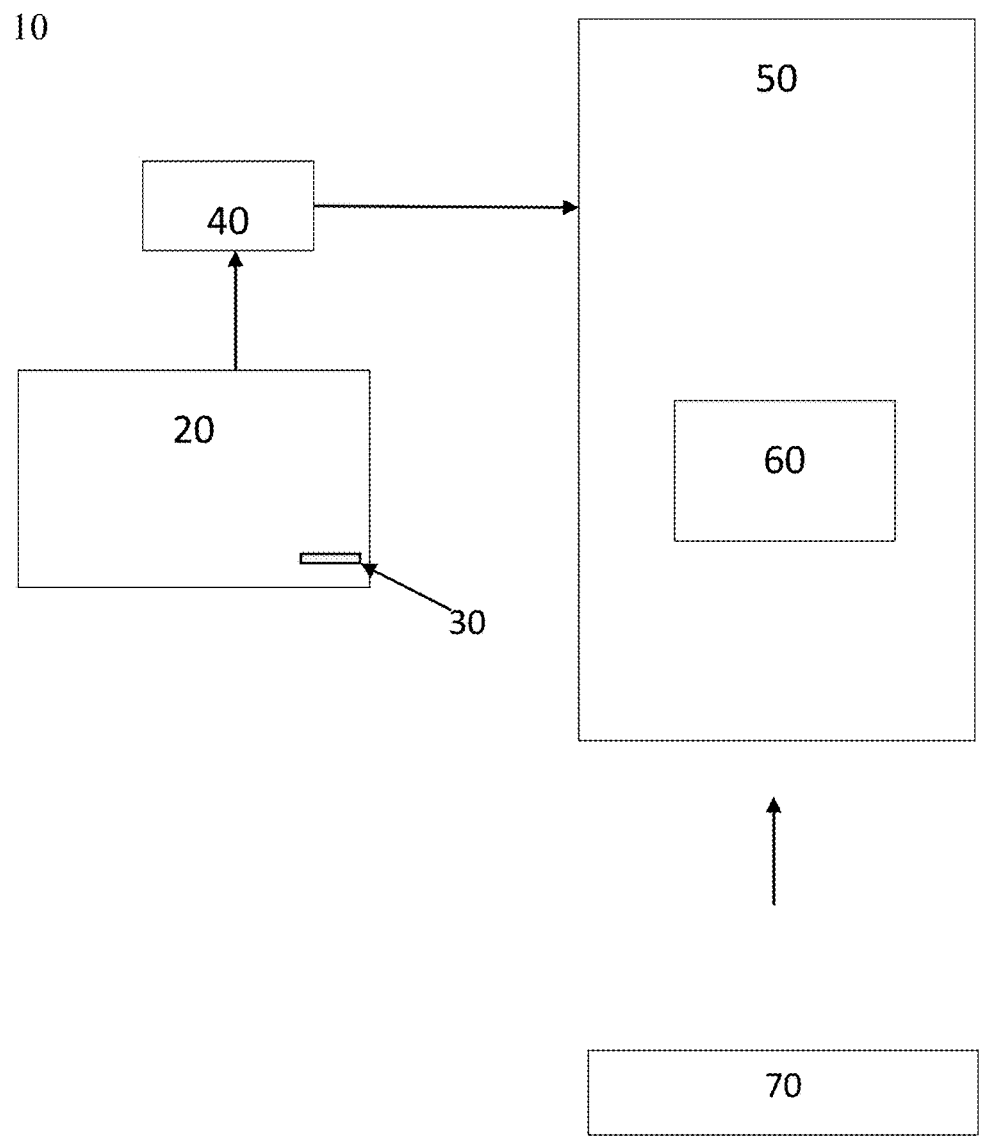
FIG. 2 shown a block diagram of the system for tracing and authentifying a canvas for tracking and authentifying artwork of the present invention.

Please also refer to FIG. 2, the verifiable codes of the present invention are linked to a blockchain processor 60.

In addition, the canvas 20 for tracking and authentifying artwork of the present invention further comprises a server 50 being connected to an APP system 70, via operation of the APP system and the technical processing of the blockchain processor 60 to trace and verify authenticity, capital investment, tracking, storage or management.

In addition, in the canvas 20 for tracking and authentifying artwork of the present invention, the plurality of NFC or RFID chips 30 are provided with the same system account so as to synchronize with the APP system 70.

In addition, in the present invention, the embodiment as shown in FIG. 1a, this invention places an NFC or RFID thread reel every 15 or 20 cm in the warp position of the yarn, and are knitted continuously with the NFC or RFID thread reels; the reel thread NFC or RFID chips placed every 13-17 cm depends on the different sizes of canvas fabric. The distribution of chips is shown in FIG. 1a.

In addition, as shown in FIG. 1b, the post-textile processing: the canvas fabric weaving from the textile machine will be cut according to fixed number (size). Each piece of canvas fabric will contain different numbers of NFC or RFID chips, and digital information engineer will bind all chips on the same canvas into the same account. The data can be synchronized when login to the phone APP, thus reducing the possibility of depletion of single NFC of RFID, increasing the protection toward NFC or RFID chip on the artworks.

As shown in FIG. 1 and FIG. 2, the system 10 for tracing and authentifying a canvas for tracking and authentifying artwork of the present invention, comprising: a canvas 20 for tracking and authentifying artwork, comprising a canvas 21 knitted from a plurality of threads 25 (include a plurality of electronic thread 251 and a plurality of normal thread 252), and a plurality of Near Field Communication (NFC) chips or Radio Frequency Identification (RFID) chips 30, each NFC or RFID chip 30 being disposed at an appropriate position of the plurality of the electronic thread 251, wherein the plurality of NFC or RFID chips 30 are for transferring verifiable coded information; a device 40 capable of reading RFID setting on a certain distance with the canvas 20 for tracking and authenticating artwork, which is capable of receiving and reading the verifiable coded information from the NFC or RFID chips 30; a server 50, being connected to the device 40 capable of reading RFID, for processing and storing the verifiable coded information from the NFC or RFID chips 30 after processing; and a blockchain processor 60, being connected to the server 50, for receiving the verifiable coded information from the NFC or RFID chips 30 after processing and integrating the processed coded information within a blockchain so as to trace and authenticate the canvas.

For the system, further comprising an application (app) system 70 for operation as follows: encoding in sequential order the NFC or RFID chips so as to establish an operation process for an automatic system, in which the NFC or RFID chips are of write-once for protection and passive chips; allowing a user or purchaser of the canvas to obtain a set of information numbers; downloading the app for activating a remote host, and an NFC or RFID system provided in the embossed cloth of the canvas, via network after registering personal information and inputting the set of information numbers; and linking a database disposed at a rear side and programming code to the blockchain, wherein the data once written is not alterable.

In the present invention, the plurality of the NFC or RFID chips are activated via an encryption key with the following format: RFID and the set of information number: inputting the set of information numbers into the application platform to activate the NFC or RFID system and to register a database record; RFID and QR code: scanning a QR code with a mobile phone, wherein the QR code encodes for the set of information numbers and the NFC or RFID system is activated after scanning to register it into the database record; and RFID and a mobile phone message: applying an electronic message system, in which a digital number message is sent to a telecommunication platform for activating the NFC or RFID system and registering into the database.

In addition, the verifiable coded information is further used for proceeding with identity certification verification of a owner (i.e. name, passport, contact number), buying and selling price, transaction hour, transaction place, creator's human identification fingerprint, work repair record, change of rights or capital flows and is accessed via the operation of the application system 70 and the processing of the blockchain processor.

Furthermore, the present system can be further used as collection editing management system, works catalog database management, copy and re-sale of works, GPS theft tracking, disaster prevention alarm sensing notification, crowdfunding artworks or rental flow management, AR or VR technology development, virtual gallery sketch, virtual exhibitions or teaching reminder.

In addition, the APP system of the present invention can be built in a mobile phone or downloaded from the server 50 by a mobile phone, and the operation flow is as follows: since the product chip is write-once for protection NFC or RFID chips and passive chips, the chip will encode in sequential order so as to establish an operation process for an automatic system, in which allowing a user or purchaser of the canvas to obtain a set of information numbers; downloading the app for activating a remote host, and an NFC or RFID system provided in the embossed cloth of the canvas, via a network after registering personal information and inputting the set of information numbers; and linking a database disposed at a rear side and programming code to a blockchain, wherein the data once written is not alterable.

The technology to activate NFC or RFID can currently be connected in a variety of ways, basically through the encryption key with the following format:

A. RFID and a set of digital numbers: Using APP as the platform, input the number, which is to activate NFC or RFID and log in to the database record.

B. RFID and QR CODE: Scan a QR CODE with a mobile phone. wherein the OR code encodes for the set of information numbers and the NFC or RFID system is activated after scanning to register it into the database record.

C. RFID and mobile phone message: applying an electronic message system, in which a digital number message is sent to a telecommunication platform for activating the NFC or RFID system for registering into the database.

Figure 3:
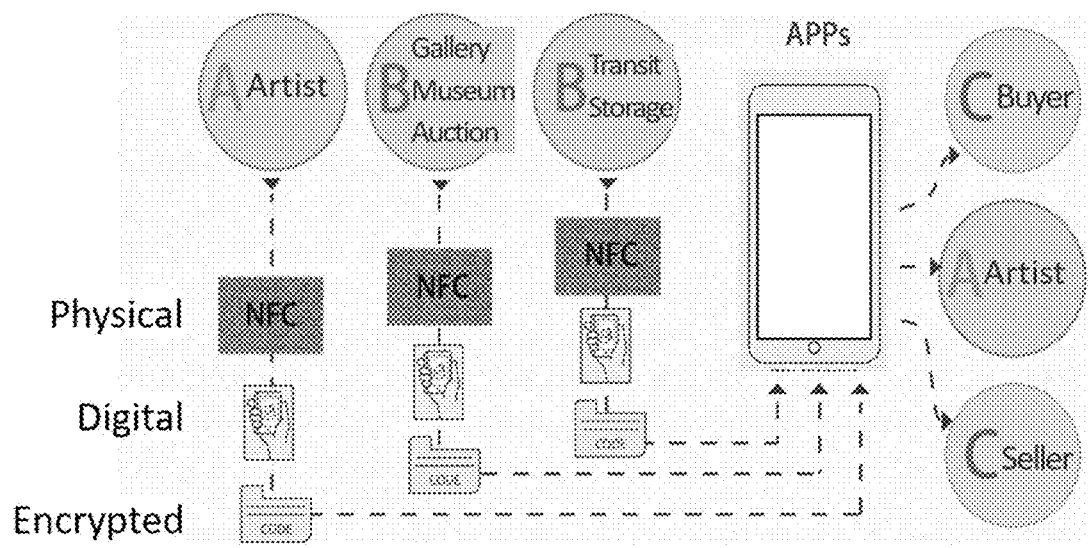
FIG. 3 shown the flow chart of starting NFC or RFID application system of the present invention.

Additionally, the operation flow of the APP system for present invention after NFC or RFID chip is activated is shown in FIG. 3.

The invention claimed is:

1. A canvas for tracking and authenticating artwork, comprising:
   a canvas manufactured from threads; and
   a plurality of radio communication chips, Near Field Communication (NFC) or Radio Frequency Identification (RFID) chips, each chip being embedded and disposed at an appropriate position of the thread,
   wherein a plurality of threads are knitted into canvas material for the canvas, and wherein the NFC or RFID chips are for transferring verifiable codes and the codes are provided with tracking and authentication information.

2. The canvas for tracking and authenticating artwork as claimed in claim 1, wherein the thread is synthetic fiber, cotton, blended fiber, imitation linen or pure linen.

3. The canvas for tracking and authenticating artwork as claimed in claim 1, wherein the plurality of NFC or RFID chips are embedded into and installed at predetermined positions in a whole or a partial part of the threads of the canvas, and wherein the canvas is knitted continuously with the NFC or RFID thread reels.

4. The canvas for tracking and authenticating artwork as claimed in claim 1, wherein the verifiable codes are linked to a blockchain.

5. The canvas for tracking and authenticating artwork as claimed in claim 1, which is used to paint an oil paint creation or a creation employed with mixed media.

6. The canvas for tracking and authenticating artwork as claimed in claim 5, wherein the oil paint is used to trace and verify authenticity, capital investment, tracking, storage or management via operation of an application system (app) and/or blockchain technology.

7. The canvas for tracking and authenticating artwork as claimed in claim 6, wherein the plurality of NFC or RFID chips are provided with the same system account so as to synchronize with the application system.

8. A system for tracing and authenticating a canvas for tracking and authenticating artwork, comprising:
   a canvas for tracking and authenticating artwork, including a canvas knitted from a plurality of threads, and a plurality of Near Field Communication (NFC) chips or Radio Frequency Identification (RFID) chips, each NFC or RFID chip being disposed at an appropriate position of the plurality of the threads, wherein the plurality of NFC or RFID chips are for transferring verifiable coded information;
   a device capable of reading RFID for receiving and reading the verifiable coded information from the NFC or RFID chips;
   a server, being connected to the device capable of reading RFID, for processing and storing the verifiable coded information from the NFC or RFID chips after processing; and
   a blockchain processor, being connected to the server, for receiving the verifiable coded information from the NFC or RFID chips after processing and integrating the processed coded information within a blockchain so as to trace and authenticating the canvas.

9. The system for tracing and authenticating a canvas for tracking and authenticating artwork as claimed in claim 8, further comprising an application (app) system for operation as follows:
   encoding in sequential order the NFC or RFID chips so as to establish an operation process for an automatic system, in which the NFC or RFID chips are of write-once for protection and passive chips;
   allowing a user or purchaser of the canvas to obtain a set of information numbers;
   downloading the app for activating a remote host and an NFC or RFID system provided in the embossed cloth of the canvas, via a network after registering personal information and inputting the set of information numbers; and
   linking a database disposed at a rear side and programming code to a blockchain, wherein the data once written is not alterable.

10. The system for tracing and authenticating a canvas for tracking and authenticating artwork as claimed in claim 9, wherein the plurality of the NFC or RFID chips are activated via an encryption key with the following format:
    RFID and the set of information number: inputting the set of information numbers into the application platform, to activate the NFC or RFID system and to register a database record;
    RFID and QR code: scanning a QR code with a mobile phone, wherein the QR code encodes for the set of information numbers, activating the NFC or RFID system after scanning, and registering it into the database record; and
    RFID and a mobile phone message: applying an electronic message system, in which a digital number message is sent to a telecommunication platform for activating the NFC or RFID system for registering into the database.

11. The system for tracking and authenticating a canvas for tracking and authenticating artwork as claimed in claim 9, wherein the verifiable coded information is further used for proceeding with identity certification verification of an owner, buying and selling price, transaction hour, transaction place, creator's human identification fingerprint, work repair record, change of rights or capital flows and is accessed via the operation of the application system and the processing of the blockchain processor.

12. The system for tracking and authenticating a canvas for tracking and authenticating artwork as claimed in claim 11, wherein the system is further used for a collection edit management system, a work catalog database management, copy and re-sale of works, GPS tracing theft, disaster prevention alert notification, artwork crowdfunding or rental flow management, AR or VR technological development, virtual gallery sketch or virtual exhibition, or teaching reminder.

13. The system for tracking and authenticating a canvas for tracking and authenticating artwork as claimed in claim 8, wherein the plurality of threads are electronic threads to be embedded into the plurality of NFC or RFID chips.

* * * * *